United States Patent
Dorok et al.

(10) Patent No.: US 6,342,012 B1
(45) Date of Patent: Jan. 29, 2002

(54) FLEXIBLE SHAFT COUPLING

(75) Inventors: Günter Dorok; Andreas Mehlan, both of Unna (DE)

(73) Assignee: Stromag AG, Unna (DE)

( * ) Notice: Subject to any disclaimer, the term of this patent is extended or adjusted under 35 U.S.C. 154(b) by 0 days.

(21) Appl. No.: 09/238,674

(22) Filed: Jan. 26, 1999

(51) Int. Cl.$^7$ ................................................ F16D 3/52
(52) U.S. Cl. ............................ 464/93; 464/66; 464/89; 192/209
(58) Field of Search .............................. 464/66, 67, 89, 464/92, 93; 192/209; 74/574

(56) References Cited

U.S. PATENT DOCUMENTS

| | | | |
|---|---|---|---|
| 1,609,448 A | * 12/1926 | Wemp | 192/209 |
| 2,386,478 A | 10/1945 | Kraft | |
| 2,397,642 A | * 4/1946 | Blazek et al. | 192/209 |
| 3,314,512 A | * 4/1967 | Kerestury | 192/209 |
| 4,873,887 A | * 10/1989 | Andra et al. | 464/24 |
| 4,914,949 A | * 4/1990 | Andra et al. | 464/87 |
| 5,213,544 A | * 5/1993 | Wolf et al. | 464/89 |
| 5,352,157 A | * 10/1994 | Ochs et al. | 464/89 |
| 5,474,499 A | * 12/1995 | Olson | 464/89 |
| 5,996,959 A | * 12/1999 | Gassen et al. | 248/635 |
| 6,006,882 A | * 12/1999 | Fukushima | 192/209 |
| 6,119,840 A | * 9/2000 | Dettmar | 192/70.17 |

FOREIGN PATENT DOCUMENTS

| | | |
|---|---|---|
| DE | 814 971 | 8/1951 |
| DE | 1 039 314 | 9/1958 |
| DE | 25 25 009 | 2/1976 |
| DE | 3601 644 A1 | 7/1986 |
| DE | 3621 187 A1 | 1/1988 |
| DE | 197 05 873 A1 | 8/1998 |

* cited by examiner

Primary Examiner—Lynne H. Browne
Assistant Examiner—Aaron Dunwoody
(74) Attorney, Agent, or Firm—Flynn, Thiel, Boutell & Tanis, P.C.

(57) ABSTRACT

Known two-step flexible shaft couplings comprise coupling parts of relatively complex configuration.

According to the invention, the coupling elements (7, 7a, 7b) are positively held at least in one circumferential direction, each coupling element comprises an axially open receiving opening that is axially engaged without play by a corresponding jaw of the other coupling part, and the elastic coupling elements comprise at least one cavity for the corresponding jaw, at least on one side of the respective receiving opening—viewed in circumferential direction—, the wall sections of each coupling element adjoining the cavity being elastically deformable.

12 Claims, 6 Drawing Sheets

FLEXIBLE SHAFT COUPLING

BACKGROUND OF THE INVENTION

The present invention relates to a flexible shaft coupling having two coupling parts connected one with the other via a plurality of flexibly deformable coupling elements distributed about the circumference of the coupling parts.

Flexible shaft couplings of this kind have been generally known in the form of flexible jaw couplings. A jaw coupling of this type includes between an outer coupling part and an inner coupling part a defined number of flexible coupling elements in the form of rubber cushions, that are held in the outer coupling part. The space between neighboring coupling elements—viewed in circumferential direction—is engaged by jaws of the inner coupling part, that exert a pressure on the rubber cushions when the two coupling parts are rotated one relative to the other. Such a flexible shaft coupling exhibits high torsional rigidity and is particularly well suited for the transmission of high torques.

From DE 36 21 187 A1 there has been known a flexible shaft coupling where a plurality of elastically deformable coupling bodies, each of hollow cylindrical configuration, are distributed in circumferential direction between a radially inner coupling hub and a radially outer coupling flange. The hollow cylindrical coupling bodies are provided on two opposite sides with holding strips molded to their outer jacket, for being introduced in axial direction into corresponding holding grooves provided on the coupling flange and/or the coupling hub. The coupling bodies are thus positioned between the coupling hub and the coupling flange, so that the coupling hub and the coupling flange are connected one with the other through the flexible coupling bodies. Each coupling body is flanked on both sides—viewed in circumferential direction—by a pair of cams with one cam each, arranged on the coupling flange, pointing radially to the inside and another cam each, arranged on the coupling hub, pointing radially to the outside. The cams are arranged at a distance from the respective coupling body, viewed in circumferential direction, and the cams of the coupling flange are axially spaced from the cams of the coupling hub so that they can move one past the other during relative rotation in circumferential direction. In the presence of low torques, the coupling elements of the flexible shaft coupling are initially subjected to thrust and shear stress until the relative rotation between the coupling hub and the coupling flange proceeds to a degree where the respective cams get into contact with the outer jacket of the coupling bodies. From that point on the coupling bodies are subjected to compressive stress. It is thus possible not only to transfer high torques with high torsional rigidity—as is the case with jaw couplings—but also to transfer low torques with relatively small torsional rigidity, so that the flexible shaft coupling provides a torsional rigidity adapted to a larger torque range.

SUMMARY OF THE INVENTION

Now, it is the object of the present invention to provide a flexible shaft coupling of the before-mentioned kind which enables in a simple way both the transmission of small torques with low torsional rigidity and the transmission of high torques with correspondingly higher torsional rigidity.

This object is achieved by the fact that the coupling elements are positively held in recesses of the one coupling part, that each coupling element comprises a receiving opening that is engaged by a corresponding jaw of the other coupling part, and that the coupling elements comprise at least one cavity, at least on one side of the respective receiving opening for the corresponding jaw—viewed in circumferential direction. The solution according to the invention allows a wide torque range to be covered. Specifically, the flexible coupling elements and, thus, the shaft coupling has a soft characteristic due to the fact that the cavities of the coupling elements can be compressed. The cavities reduce the torsional rigidity of the coupling elements due to the fact that cavities neighboring the wall sections of each coupling element are deformed already in the presence of small torques. In a higher torque range, the cavities are compressed to a block so that the flexible coupling elements act in the way of block-shaped elastically deformable coupling elements, which results in a hard characteristic. Thus, once the cavities are compressed, the flexible coupling elements are subjected to compressive stress, in consequence of the resulting block form, so that a hard torque characteristic similar to that of a known flexible jaw coupling is obtained. The soft lower torque range extends preferably over 15% to 20% of the nominal torque range covered by the flexible shaft coupling. The cavities are open either axially or radially, depending on the orientation of the coupling elements, so that in the event of any deformation of the adjoining wall sections no pressure differentials can occur between the interior of the cavity and its environment. The solution according to the invention therefore provides two steps of flexibility of the coupling elements, whereby a two-step flexible shaft coupling is obtained. Depending on the configuration of the cavities and the thickness of the wall sections adjoining the cavities, it is also possible to make the coupling elements deformable in more than two steps until they assume the shape of a closed block, in which case the cavities with the adjoining thin wall sections are the first to be compressed to the shape of a block, while the remaining cavities with correspondingly thicker adjoining wall sections are compressed only thereafter, over an even higher torque range. The soft deformation characteristic—compared with the coupling elements compressed to block shape—results for cavities arranged on both sides of the receiving openings for the corresponding jaws—viewed in circumferential direction—from the fact that the leading cavities in the sense of rotation are compressed whereas the trailing cavities in the sense of rotation are extended. Given the fact that on the one hand the coupling elements are positively held in recesses in the one coupling part and that on the other hand the jaws closely engage the respective receiving openings of the coupling elements, the shaft coupling operates without play over the entire torque range. According to a particularly advantageous feature, the individual elements of the shaft coupling can be simply fitted together in axial direction, when the coupling elements are axially aligned, it being merely necessary to insert the jaws axially into the coupling elements, which are already positioned in the recesses of the other coupling part. This intermateability enables the parts to be assembled blind inside a transmission bell. In addition, the intermateability of the coupling permits shaft displacements to be accommodated in radial, axial and angular direction. Another significant advantage of the solution according to the invention lies in the fact that the shaft coupling requires only little overall space, as the two or more steps of the torque characteristic can be realized with a single sort of coupling element. Advantageously, the one-piece coupling elements are made integrally from an elastic, resilient material, especially from rubber or a rubber substitute. The rubber substitute employed may consist of thermoplastic elastomers, composite materials or similar materials, in addition to the usual substitute materials, such as silicone or the like.

According to a further development of the invention, the cavities are configured as displacement spaces that are open or closed in a radial plane related to the axis of rotation. This allows the deformation characteristic to be additionally influenced.

According to a further development of the invention, at least one cavity is provided in each coupling element on both sides—viewed in circumferential direction—of the respective receiving opening. This allows the shaft coupling to be operated in both senses of rotation.

According to a further development of the invention, the cavities are configured in each coupling element symmetrically to the receiving opening, viewed in circumferential direction. This enables the coupling to be operated identically in both senses of rotation.

According to a further development of the invention, the cavities exhibit an asymmetrical configuration, depending on the sense of rotation. This makes the coupling operable in only one sense of rotation, the cavities being configured in a way especially adapted to the requirements of that particular sense of rotation.

According to a further development of the invention, the coupling elements are provided with a jacket made from a material with functional properties different from those of the flexibly deformable material of the coupling elements. This further extends the possible range of applications of the coupling. If the jacket is made from a metal or the like, this provides an advantageous support for the soft elastomer. A molded-on jacket further serves to achieve efficient fixing, especially by an interference fit, of the coupling elements in the recessed projections of the coupling flange.

According to a further development of the invention, the closed displacement spaces are part of a damping circuit operating with a damping agent. This makes the coupling elements act additionally as damping members in the circumferential direction.

Other advantages and features of the invention will become apparent from the sub-claims and the following description of certain preferred illustrated embodiments of the invention, with reference to the drawings, in which:

DESCRIPTION OF THE PREFERRED EMBODIMENT

Figure 1:
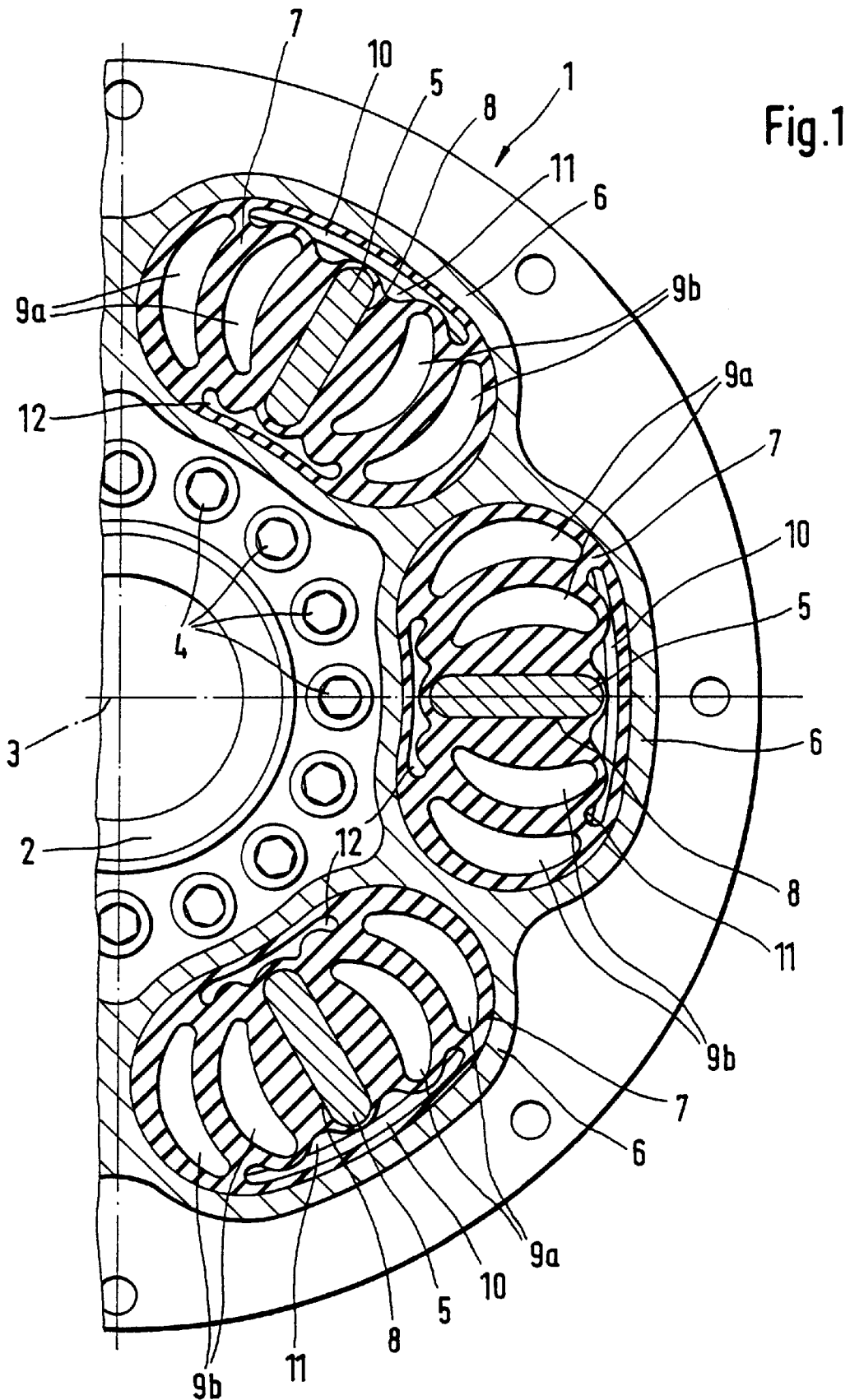
FIG. 1 shows a cross-section through a first embodiment of a shaft coupling according to the invention with only the right half of the rotationally symmetrical coupling being shown.
Figure 2:
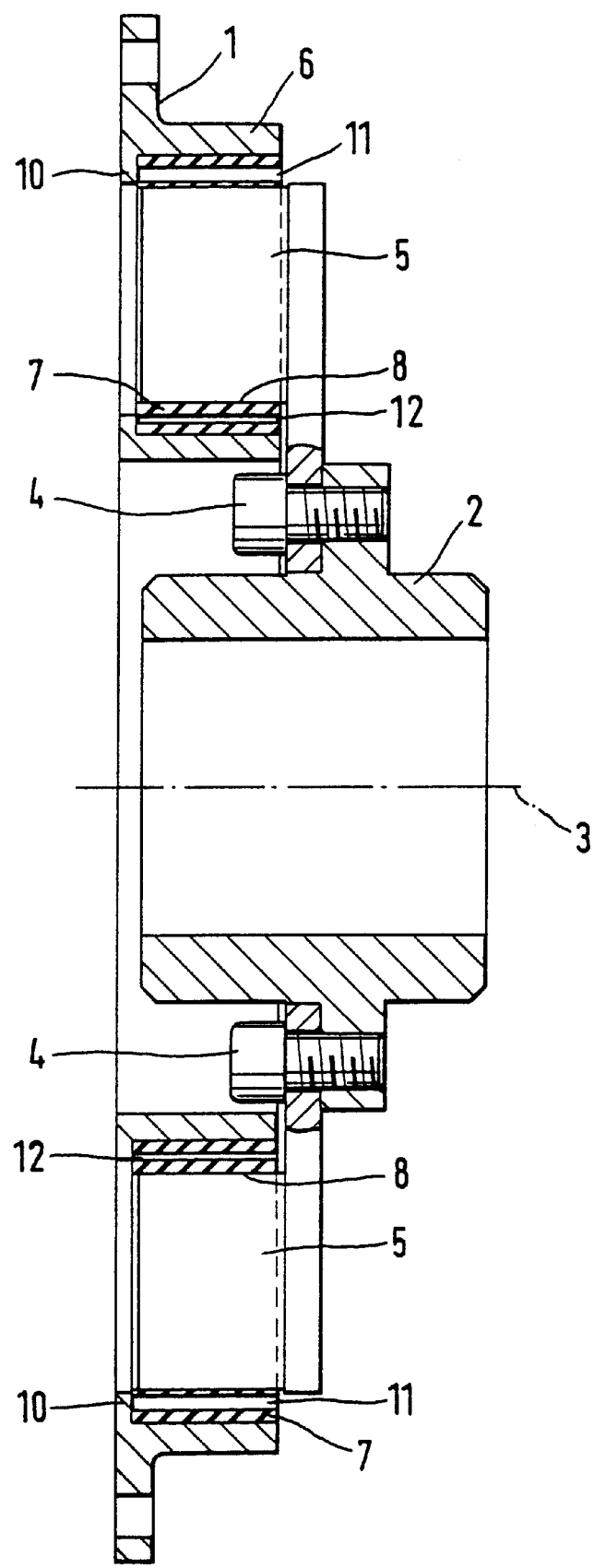
FIG. 2 shows a longitudinal section through the shaft coupling according to FIG. 1.
Figure 3:
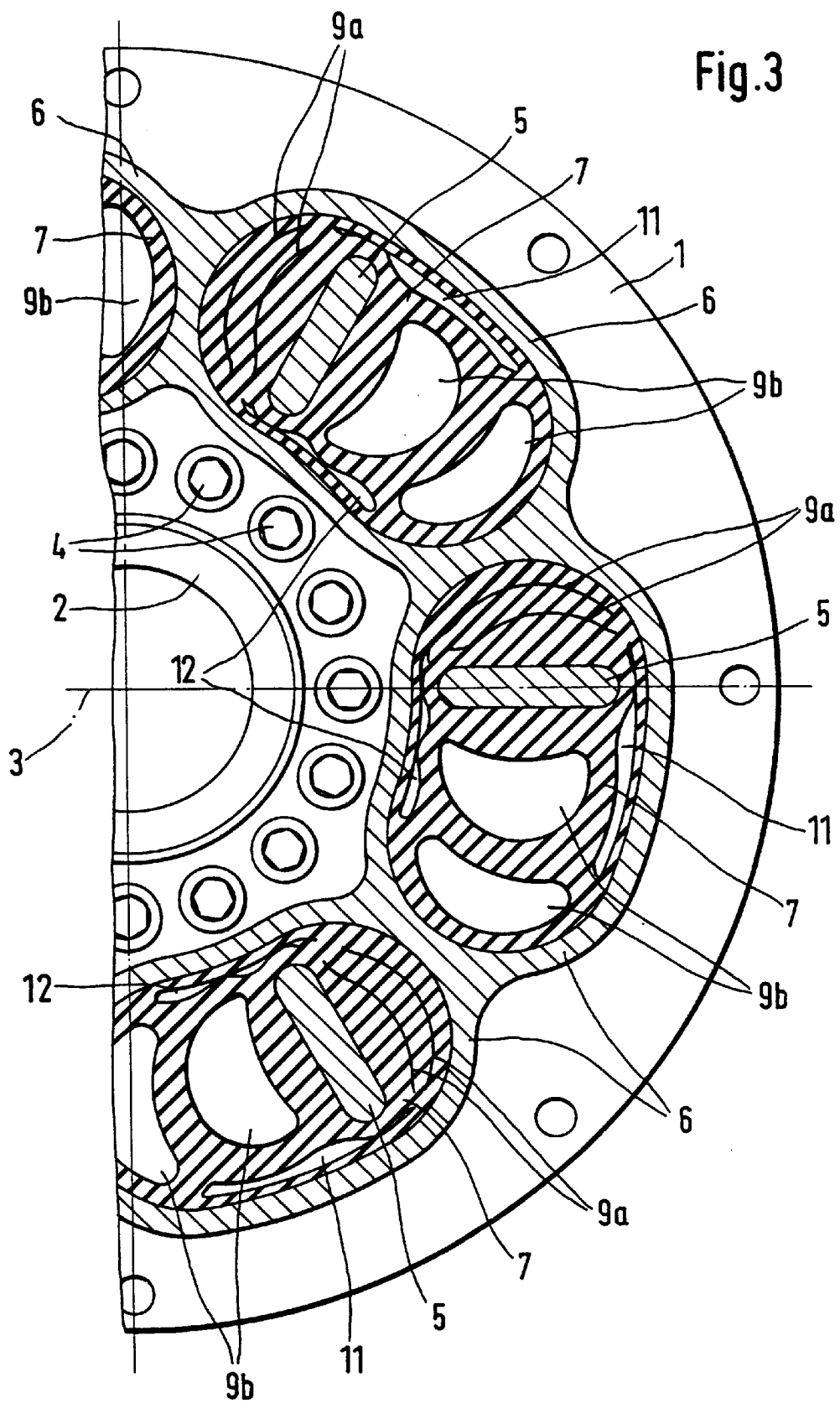
FIG. 3 shows the right half of the cross-section of the shaft coupling according to FIG. 1, but in rotated condition with deformed coupling elements.

A flexible shaft coupling according to FIGS. 1 through 3 comprises a coupling flange 1 made from metal, that serves as an outer coupling part. A coupling hub 2 forms an inner coupling part. The coupling hub 2 and the coupling flange 1 have a concentric configuration, relative to a common axis of rotation 3, the axis of rotation 3 representing merely the ideal axis of symmetry of the coupling flange 1 and the coupling hub 2. In practical embodiments of the shaft coupling, possible displacements may occur between the coupling flange 1 and the coupling hub 2 so that those parts may exhibit different axes of rotation in practice. The coupling flange 1 comprises recessed projections 6, formed integrally on the coupling flange 1, that are distributed in annular arrangement over its circumference and are axially aligned and connected one with the other in circumferential direction. Each recessed projection 6 comprises a substantially oval recess—in the top view of FIG. 1—that is axially open to both sides. Each recess is provided on an axial rear face (FIG. 2) with an all-round supporting rim 10 projecting into the recess in a radial plane and forming a rearward axial support for a coupling element 7 inserted axially into the recess of the recessed projection 6. Distributed over the circumference of the coupling flange 1, there are provided a total of six recesses with a coupling element 7 axially inserted and positively fitted in each of them.

In the illustrated embodiment, each coupling element 7 is an elastically deformable element configured as a single-piece rubber component. In other embodiments of the invention, the coupling elements are likewise made as one piece, but from rubber substitutes. All coupling elements 7 arranged in the recesses of the coupling flange 1 are identically configured. Each coupling element 7 comprises a substantially oval outer contour, corresponding to the matching recess in the recessed projection 6. The shape of each coupling element 7 is symmetrical with respect to a radial line, relative to the axis of rotation 3. In this respect, each coupling element 7 comprises a radially directed, elongated receiving opening 8 of oval shape, arranged within a block-like center portion of each coupling element 7. The receiving opening 8 is axially open toward both the front and the rear, and serves to axially receive a jaw 5 of the coupling hub 2 to be described in more detail further below. Beside the receiving opening 8—viewed in circumferential direction— each coupling element 7 is provided on both of its sides with two sickle-shaped cavities 9a, 9b, the cavities 9a being arranged in the coupling element 7 one behind the other— viewed circumferentially in counter-clockwise direction—in the representation of FIGS. 1 and 3, and the cavities 9b being provided in the coupling element 7 in clockwise direction in corresponding mirror-symmetrical arrangement relative to the longitudinal axis of the respective receiving opening 8. Related to the radial longitudinal axis of the receiving opening 8, the cavities 9a are provided in mirror-symmetrical configuration relative to the cavities 9b, and constitute displacement spaces closed in the rotary plane of the coupling flange, but axially open toward both end faces and delimited in the rotary plane of the coupling flange 1 on all sides by corresponding wall sections of the coupling element 7. Further, each coupling element 7 comprises an additional displacement space 11 extending in circumferential direction in a radially outer portion of the coupling element 7, as well as an inner displacement space 12 extending in circumferential direction in a radially inner section of the coupling element 7. The outer and the inner displacement spaces 11, 12 of each coupling element 7 serve to allow a sufficient degree of elastic deformation of the hollow spaces 9a, 9b and, thus, of the associated wall sections of the coupling element 7.

Fixed on the coupling hub 2 by a plurality of mounting screws 4 is a flange ring that projects in radially outward direction and carries six jaws 5 projecting axially to one side. The jaws 5 are formed integrally with the flange ring, the jaws 5, including the flange ring and the coupling hub 2, being made from metal. The jaws 5 form together with the flange ring and the mounting screws 4 a functional part of the coupling hub 2. The outer contour of each jaw 5 is adapted to the shape of the receiving opening 8 of the associated coupling element 7 in such a way that the receiving opening 8 is completely filled and axially engaged by the jaw 5. The axial length of the jaw 5 corresponds to the axial depth of the receiving opening 8. The jaws 5 are fitted in the receiving openings 8 from the forward end of the coupling elements 7, opposite the supporting rims 10, with the flange ring of the coupling hub 2 maintaining a small axial distance from the neighboring end face of the recessed projections 6. It is thus ensured that the two coupling elements of the described flexible coupling are mated without play. Since the coupling hub 2 projects in part axially into the coupling flange 1, the whole coupling exhibits only a small axial overall length (FIG. 2).

Now, when a torque is exerted upon the coupling in clockwise direction (FIG. 3), the spaces 9a are deformed and, as the torque rises, are compressed to block shape so that once the torque range, at which the cavities 9a are fully compressed, has been reached that side of each coupling element 7 acts like a block-shaped rubber cushion. From that torque range on, the coupling elements 7 are subjected exclusively to compressive stress. At the same time, the spaces 9b as well as the displacement spaces 11 and 12 are extended in the sense of rotation. In a torque range below the maximum deformation of the coupling element 7, the coupling elements 7 exhibit a soft deformation characteristic because the bellows-like deformation of the wall sections defining the spaces 9a offer a much lower resistance to deformation by the relative rotation between the coupling hub 2 and the coupling flange 1. One thus obtains a two-step function of the shaft coupling, which makes the latter particularly well suited for use in boat drives in order to avoid gear noise, produced by the disengagement of the teeth, during idling or under low partial load of the boat drive, especially a diesel engine. Due to the special design of its coupling element 7, the shaft coupling according to FIGS. 1 to 3 is designed in such a way as to provide a flat torsion curve with a soft characteristic in the idling and partial load range of such a boat drive, which in the second stage, in which the cavities 9a are compressed to block form, rises very progressively to arrive at a substantially higher torsional rigidity in normal operation of the boat drive. The coupling elements 7 of the shaft coupling according to FIGS. 1 to 3 being configured mirror-symmetrically relative to the central receiving openings 8 and, thus, to the respective jaw 5, the shaft coupling can be operated in the same way also in reverse direction.

Figure 4:
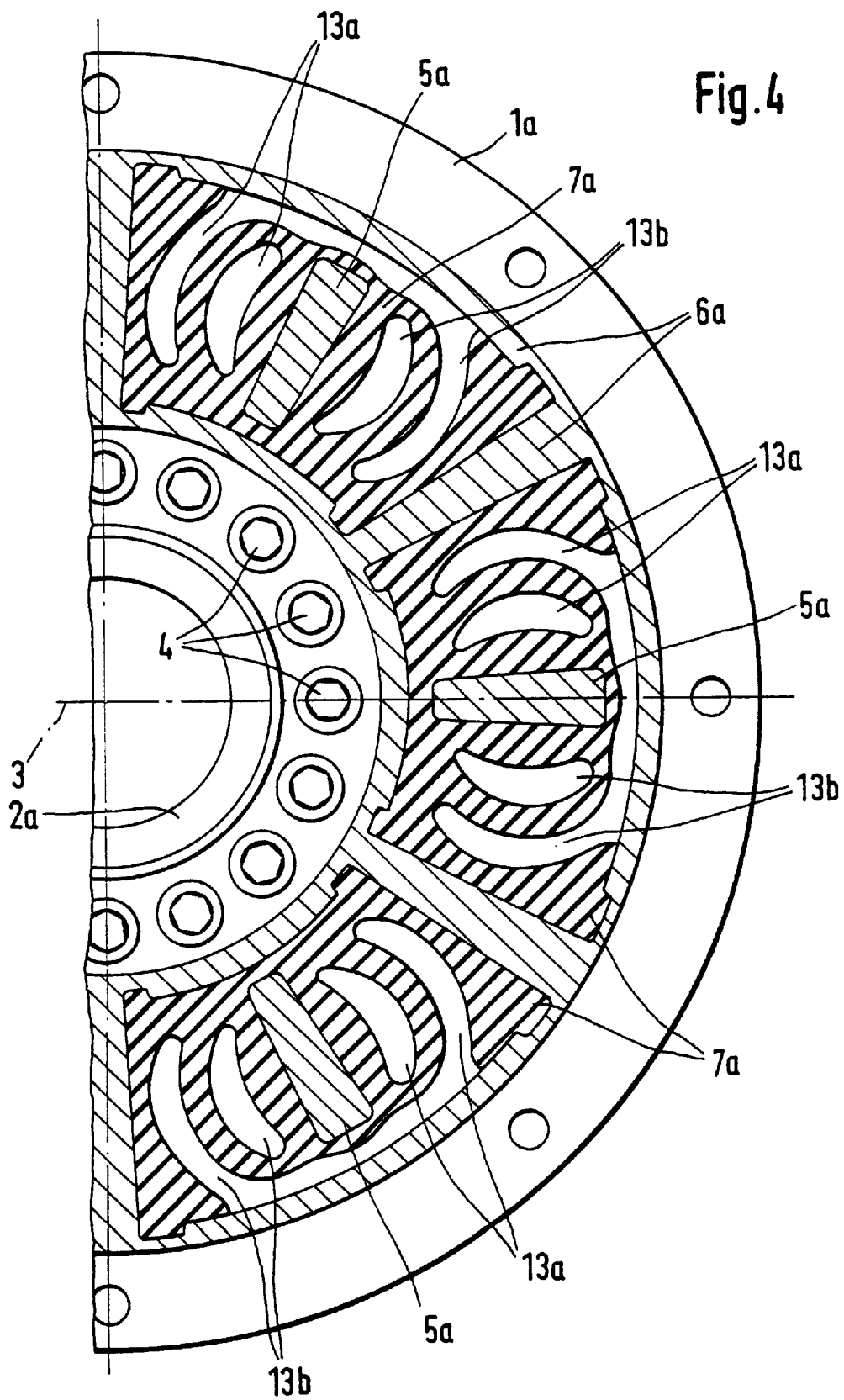
FIG. 4 shows another embodiment according to the invention of the shaft coupling of FIG. 1, but with differently configured coupling elements.
Figure 5:
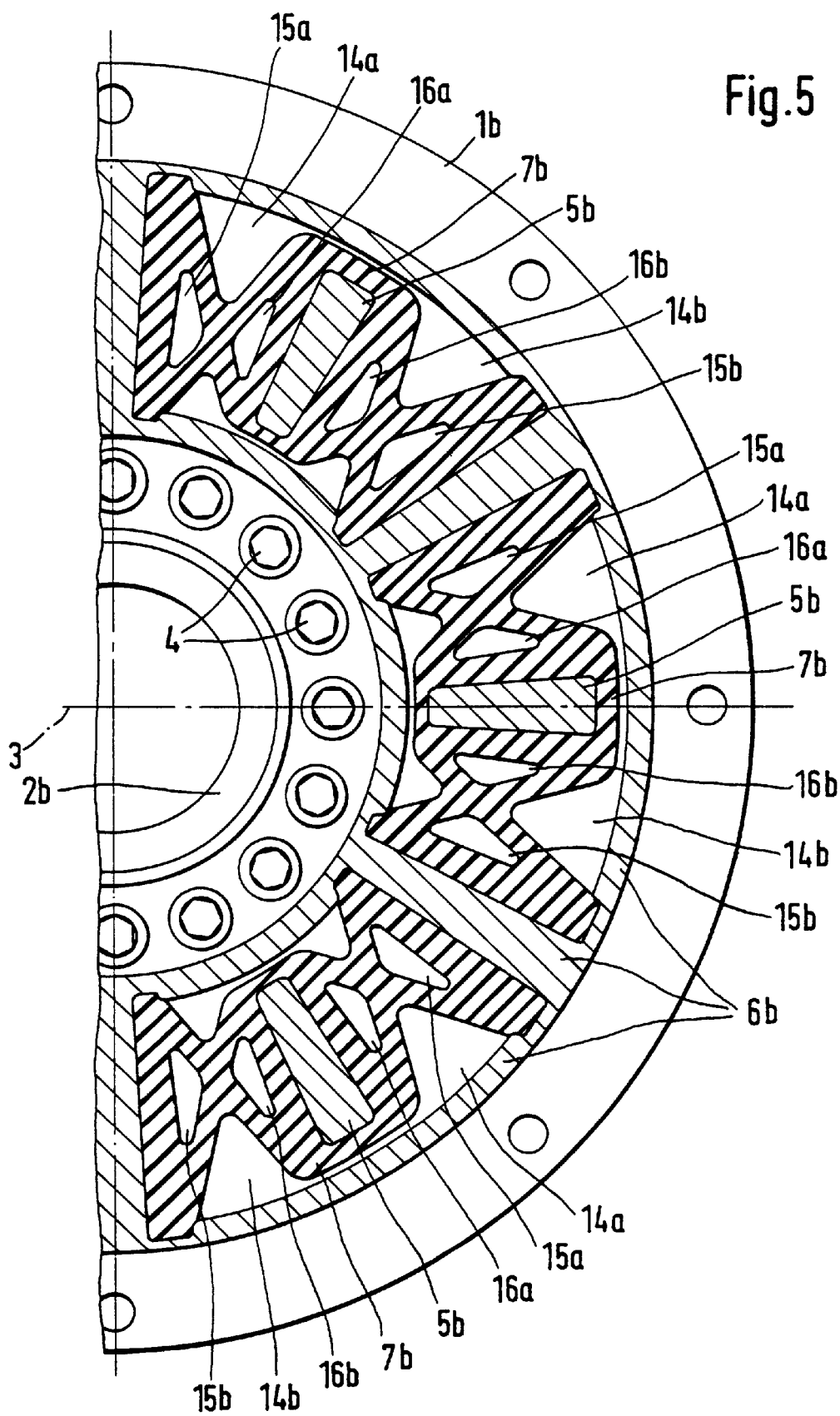
FIG. 5 shows a last embodiment of a shaft coupling according to the invention, with modified coupling elements as compared with the shaft couplings according to FIGS. 1 and 4.

The structure and function of the shaft coupling according to FIGS. 4 and 5 correspond substantially to the shaft coupling according to FIGS. 1 to 3 described above, so that hereafter only the modifications implemented in these shaft couplings will be described in detail. The coupling flanges 1a and 1b (FIGS. 4 and 5) have modified recessed projections 6a, the corresponding recesses exhibiting substantially the shape of circular ring segments. The coupling elements 7a and 7b have been modified correspondingly. The cross-section of the jaws 5a and 5b is no longer oval, as in the embodiment according to FIGS. 1 to 3, but rather trapezoidal. The coupling elements 7a and 7b are not exclusively provided with closed cavities 13a, 13; 15a, 16a, 15b, 16b, but also with cavities 13a, 13b; 14a; 14b that are open toward the radially outer wall sections of the recessed projections 6a, 6b. This results in slightly different deformation characteristics of the coupling element 7a in the lower torque range, while the basic gradation between a soft lower deformation range and a hard characteristic in an upper torque range corresponds to the structure of the shaft coupling according to FIGS. 1 to 3. The coupling elements 7b according to FIG. 5 exhibit a concertina-like cross-section, whereas the cross-section of the coupling elements 7a according to FIG. 4 resembles a blossom or bulb. Generally, all elements of the shaft coupling serving the same functions in both embodiments according to FIGS. 4 and 5, and in the embodiment according to FIGS. 1 to 3, have been indicated by the same reference numerals, supplemented only by the letter "a" for FIG. 4 and the letter "b" for FIG. 5. Identical parts and elements are indicated by identical reference numerals (mounting screws 4, axis of rotation 3).

Figure 6:
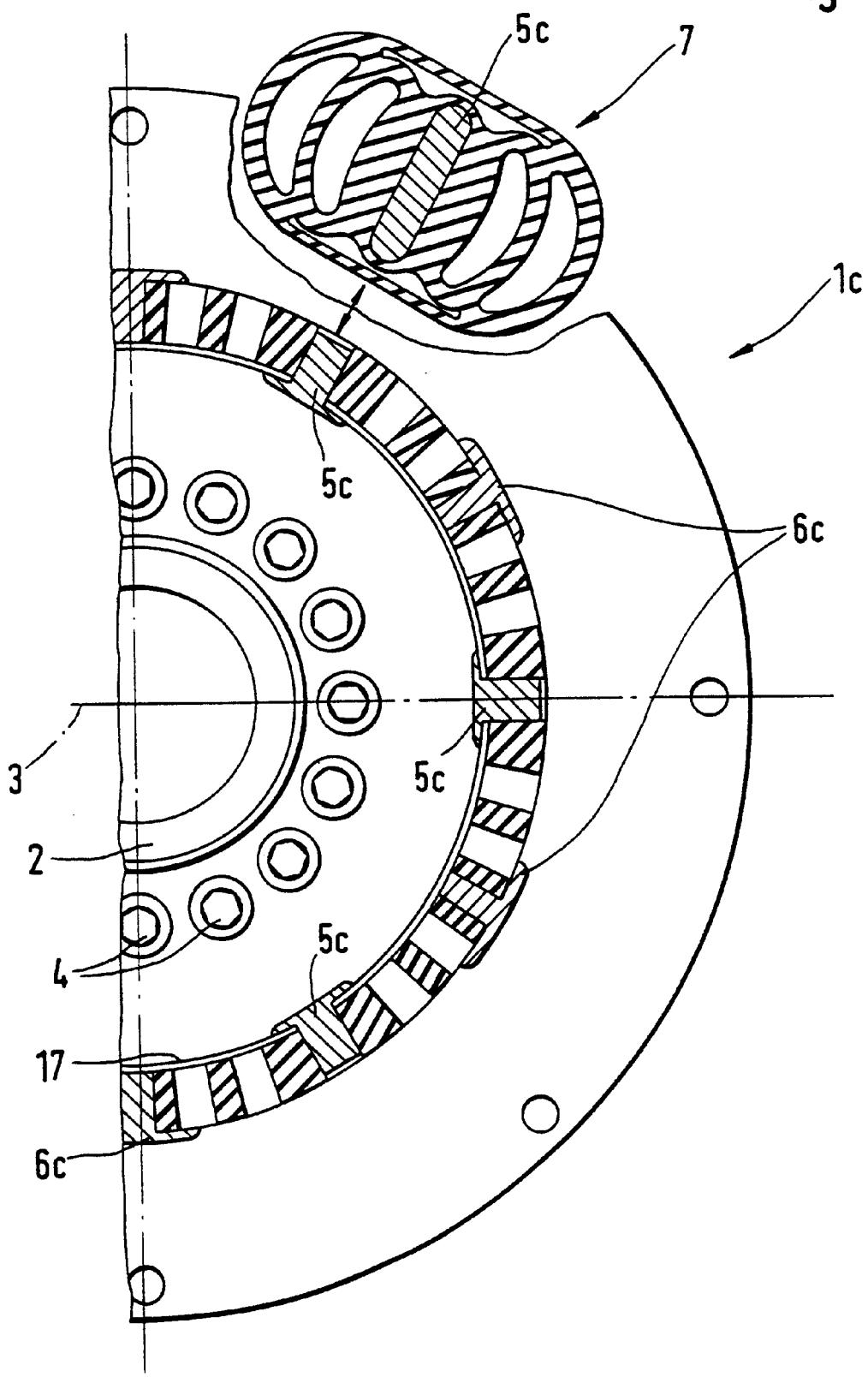
FIG. 6 shows a last embodiment of a shaft coupling according to the invention where the coupling elements are configured identically to the embodiment shown in FIG. 1, but are positioned so that the cavities are radially directed.

A flexible shaft coupling according to FIG. 6 comprises a coupling flange 1c, connected with a coupling hub 2 via coupling elements 7. The coupling elements 7 are configured identically to the coupling elements 7 according to FIGS. 1 to 3 so that reference is made to the description of the embodiment according to FIGS. 1 to 3 for closer details. In the embodiment illustrated in FIG. 6, the coupling elements 7 are, however, aligned not axially, but radially—related to the axis of rotation 3. They are embedded in correspondingly configured recessed projections 6c of the coupling flange 1c. The central receiving opening of each coupling element 7 is engaged by a jaw 5c of the coupling hub 2, which in the illustrated embodiment are radially aligned and held in radially spaced distribution on an all-round flange ring 17 that is rigidly connected with the coupling hub 2. Except for the modifications resulting from the radial alignment of the coupling elements, the function of the shaft coupling according to FIG. 6 corresponds generally to that of the embodiment according to FIGS. 1 to 3.

What is claimed is:

1. Flexible shaft coupling having two coupling parts connected one with the other via a plurality of flexibly deformable, integrally formed coupling elements distributed about the circumference of the coupling parts, wherein the coupling elements (7, 7a, 7b) are positively held in recesses of the one coupling part (1, 1a, 1b), each coupling element (7, 7a, 7b) comprises a receiving opening (8) that is engaged without play by a corresponding jaw (5, 5a, 5b) of the other coupling part (2), and the coupling elements (7, 7a, 7b) comprise at least one cavity (9a, 9b, 11, 12; 13a, 13b; 14a, 15a, 16a, 14b, 15b, 16b) at least on one side of the respective receiving opening for the corresponding jaw (5, 5a, 5b)—viewed in circumferential direction.

2. The shaft coupling as defined in claim 1, wherein the cavities (9a, 9b, 11, 12; 13a, 13b; 14a, 15a, 16a, 14b, 15b, 16b) are configured as displacement spaces that are open or closed in a radial plane related to the axis of rotation.

3. The shaft coupling as in claim 2, wherein the coupling elements are provided with a jacket made from a material with functional properties different from those of the flexibly deformable material of the coupling elements.

4. The shaft coupling as in claim 2, wherein at least one cavity (9a, 9b, 11, 12; 13a, 13b; 14a, 15a, 16a, 14b, 15b, 16b) is provided in each coupling element (7, 7a, 7b) on both sides—viewed in circumferential direction—of the respective receiving opening (8).

5. The shaft coupling as defined in claim 2, wherein the cavities (9a, 9b, 11, 12; 13a, 13b; 14a, 15a, 16a, 14b, 15b, 16b) exhibit an asymmetrical configuration, depending on the sense of rotation.

6. The shaft coupling as in claim 5, wherein the coupling elements are provided with a jacket made from a material with functional properties different from those of the flexibly deformable material of the coupling elements.

7. The shaft coupling as defined in claim 1, wherein at least one cavity (9a, 9b, 11, 12; 13a, 13b; 14a, 15a, 16a, 14b, 15b, 16b) is provided in each coupling element (7, 7a, 7b) on both sides—viewed in circumferential direction—of the respective receiving opening (8).

8. The shaft coupling as in claim 7, wherein the coupling elements are provided with a jacket made from a material with functional properties different from those of the flexibly deformable material of the coupling elements.

9. The shaft coupling as defined in claim 7, wherein the cavities (9a, 9b, 11, 12; 13a, 13b; 14a, 15a, 16a, 14b, 15b, 16b) are configured in each coupling element (7, 7a, 7b) symmetrically to the receiving opening, viewed in circumferential direction.

10. The shaft coupling as in claim 9, wherein the coupling elements are provided with a jacket made from a material with functional properties different from those of the flexibly deformable material of the coupling elements.

11. The shaft coupling as in claim 1, wherein the coupling elements are provided with a jacket made from a material with functional properties different from those of the flexibly deformable material of the coupling elements.

12. The shaft coupling as in claim 1, wherein a torque between said one coupling part and said the other coupling part is transferred through said coupling element.

* * * * *